United States Patent
Frånberg

(10) Patent No.: US 6,684,881 B2
(45) Date of Patent: Feb. 3, 2004

(54) RECHARGEABLE BREATHING APPARATUS PARTICULARLY AN APPARATUS FOR DIVERS

(76) Inventor: Oskar Frånberg, Richtersgatan 2E:5024, Göteborg (SE), S-412 81

(*) Notice: Subject to any disclaimer, the term of this patent is extended or adjusted under 35 U.S.C. 154(b) by 0 days.

(21) Appl. No.: 10/281,664

(22) Filed: Oct. 28, 2002

(65) Prior Publication Data

US 2003/0101996 A1 Jun. 5, 2003

Related U.S. Application Data

(63) Continuation of application No. PCT/SE01/00886, filed on Apr. 25, 2001.

(30) Foreign Application Priority Data

Apr. 28, 2000 (SE) .............................................. 0001615

(51) Int. Cl.⁷ .............................................. A61M 15/00
(52) U.S. Cl. .............................. 128/202.26; 128/205.12; 128/205.28
(58) Field of Search ........................ 128/202.26, 205.12, 128/205.28

(56) References Cited

U.S. PATENT DOCUMENTS

| | | | | |
|---|---|---|---|---|
| 1,201,565 A | * | 10/1916 | Davidson | 128/202.26 |
| 1,808,177 A | * | 6/1931 | Putter | 128/205.28 |
| 1,983,475 A | * | 12/1934 | Lemoine | 128/202.26 |
| 2,492,272 A | * | 12/1949 | Dauster | 128/202.26 |
| 2,931,357 A | * | 4/1960 | Arborelius et al. | 128/204.28 |
| 3,500,827 A | * | 3/1970 | Paine | 128/202.26 |
| 3,692,026 A | * | 9/1972 | Tepper et al. | 128/202.26 |
| 3,736,104 A | * | 5/1973 | Churchill et al. | 422/120 |
| 3,742,683 A | * | 7/1973 | Sebest et al. | 422/113 |
| 3,756,785 A | * | 9/1973 | Netteland | 422/120 |
| 3,815,592 A | * | 6/1974 | Staub, Jr. | 128/202.26 |
| 3,868,225 A | * | 2/1975 | Tidd | 422/122 |
| 3,898,047 A | * | 8/1975 | Cramer | 422/122 |
| 3,920,803 A | * | 11/1975 | Boryta | 423/579 |
| 4,104,466 A | * | 8/1978 | Tsuchida et al. | 546/2 |
| 4,154,236 A | * | 5/1979 | Eckstein et al. | 128/202.26 |
| 4,164,218 A | * | 8/1979 | Martin | 128/201.18 |
| 4,188,947 A | * | 2/1980 | Pasternack | 128/202.26 |
| 4,314,566 A | * | 2/1982 | Kiwak | 128/204.15 |
| 4,325,364 A | * | 4/1982 | Evans | 128/201.13 |
| 4,498,470 A | * | 2/1985 | Warncke | 128/202.26 |
| 4,515,156 A | | 5/1985 | Khudosovtsev et al. | |
| 4,515,456 A | * | 5/1985 | Ferrante | 128/202.26 |
| 4,526,758 A | * | 7/1985 | Alengoz et al. | 422/122 |
| 4,665,910 A | * | 5/1987 | Kolbe et al. | 128/202.26 |
| 5,485,834 A | | 1/1996 | Joye et al. | |
| 5,653,226 A | | 8/1997 | Heyer et al. | |

FOREIGN PATENT DOCUMENTS

GB 2 200 289 A 8/1988

OTHER PUBLICATIONS

Abstract of JP48043552B.

* cited by examiner

*Primary Examiner*—Aaron J. Lewis
(74) *Attorney, Agent, or Firm*—Lerner, David, Littenberg, Krumholz & Mentlik, LLP

(57) ABSTRACT

A rechargeable breathing apparatus is disclosed including a closed breathing system for receiving exhaled air containing a $CO_2$ adsorber for the inhaled air, a breathing bellows for receiving the inhaled air and delivery of the breathing air, and an oxygen accumulator connected to the breathing bellows and containing a reversably oxygen fixating agent and being rechargeable by bringing that agent into reaction with oxygen or air so that oxygen is fixated thereto. In one apparatus there is included a pressurized gas container and a hydrostatic valve for cooperation between the breathing bellows and the pressurized gas container.

14 Claims, 1 Drawing Sheet

RECHARGEABLE BREATHING APPARATUS PARTICULARLY AN APPARATUS FOR DIVERS

CROSS REFERENCE TO RELATED APPLICATIONS

The present application is a continuation of International Application No. PCT/SE01/00886, filed on Apr. 25, 2001, in the English language, the disclosure of which is incorporated by reference herein.

FIELD OF THE INVENTION

The present invention relates to a rechargeable breathing apparatus with a closed breathing system, in particular for aqua divers and smoke divers, comprising a breathing bellows for receiving the exhaled air, which is connected, by means of a hydrostatic valve, to a pressurized gas container, and which bellows is arranged to deliver breathing air to the diver subsequent to removal of $CO_2$ and addition of $O_2$.

BACKGROUND OF THE INVENTION

Breathing devices for diving in water may be divided into three main groups, open, closed, and semi-closed systems. In open systems, the inhalation is made from a pressurized bottle, and the exhalation is made directly to the surrounding water. The drawbacks are that unconsumed oxygen gas is breathed directly into the water. During deep-sea diving the air source has to be replaced during the descent and ascent, in order for the diver not to suffer from poisoning or lack of oxygen. The system is relatively noisy; it has a high acoustic profile, and emits air bubbles. Further, it demands a surface organization, with access to a compressor or pressurized bottles. The advantage is the relative simplicity of the system.

Closed and semi-closed systems involve purification of the exhaled air from carbon dioxide in a container with, for example, calcium hydroxide. The purified gas then continues to a breathing sack, where new oxygen gas is added from a pressurized bottle. It is also possible to add new inert gas from an inert gas-bottle, in order to compensate for any increase in depth. The drawbacks are the complexity and vulnerability of the system for dosage and monitoring, the toxicity of the calcium hydroxide, and the fact that it is a consumable substance that has to be replaced after each dive. Pressurized oxygen entails risk of fire or explosion. This system too, demands an extensive surface organization, with ability to supply calcium hydroxide, pressurized oxygen, and inert gas. The advantages of a closed system is that the system does not generate any bubbles and has a low noise level, and that there is no need for gas replacement when descending and ascending during deep-sea diving. The advantages with a semi-closed system are that it produces less bubbles than an open system, and that it has a low noise level. The disadvantage is the difficulty to control the oxygen partial pressure, and the large surface organization needed in order to provide mixed gas and calcium hydroxide.

One of the objects of the present invention is to provide a breathing apparatus which:

should be rechargeable,
is dependent only on a minimal surface organization,
can remain operative during long periods of time.
has a simple construction and is robustly built,
lacks sensitive electronic components,
utilizes exclusively reliable mechanical gauges for monitoring, the function of which are unimportant for the function of the system as such,
has a low weight,
maintains the oxygen partial pressure relatively constant at low pressures,
alternatively maintains $PO_2$ within a narrow interval,
has a low noise level and is bubble free at a constant depth,
is associated with a very low risk of fire or explosion, and which
counteracts an increase in $PO_2$ during descent/fall.

SUMMARY OF THE INVENTION

In accordance with the present invention, these and other objects have now been realized by the invention of a rechargeable breathing apparatus including a closed breathing system for receiving exhaled air containing carbon dioxide and supplying breathing air therefrom, the apparatus comprising means for adsorbing $CO_2$ from the exhaled air, a breathing bellows for receiving the exhaled air and delivering the breathing gas, and an oxygen accumulator connected to the bellows, the oxygen accumulator containing a reversably oxygen fixating agent and being rechargeable by bringing the reversably oxygen fixating agent into reaction with oxygen or air whereby the oxygen is fixated thereto. In a preferred embodiment, the apparatus includes a pressurized gas container for a predetermined gas, and means for hydrostatic cooperation between the breathing bellows and the pressurized gas container. In a preferred embodiment, the apparatus is adapted for use by an aqua diver or a smoke diver.

In accordance with one embodiment of the rechargeable breathing apparatus of the present invention, the apparatus includes a temperature control element in connection with the oxygen accumulator. Preferably, the temperature control element comprises a heating or cooling element.

In accordance with another embodiment of the rechargeable breathing apparatus of the present invention, the reversably oxygen fixating agent comprises a metal complex, and preferably a metallic complex such as cobalt-bis-salicylaldehyde-ethylene-diimine (Salcomine), cobalt-bis-3-fluoro-salicylaldehyde-ethylene-diimine (Fluomine), and cobalt-bis-3-ethoxy-salicylaldehyde-ethylene-diimine.

In accordance with another embodiment of the rechargeable breathing apparatus of the present invention, the reversably oxygen fixating agent comprises a metal complex such as a cobalt phorfyrin.

In accordance with another embodiment of the rechargeable breathing apparatus of the present invention, the reversably oxygen fixating agent comprises a simple inorganic salt.

In accordance with another embodiment of the rechargeable breathing apparatus of the present invention, the apparatus includes a chamber surrounding the oxygen accumulator, and a carbon dioxide absorber connected to the chamber.

In accordance with another embodiment of the rechargeable breathing apparatus of the present invention, the oxygen accumulator includes at least one outlet, and the apparatus includes a particle filter connected to the at least one outlet, and a water vapor absorbing filter connected to the at least one outlet.

In accordance with one embodiment of the apparatus of the present invention, the predetermined gas can be helium, air or another diveable gas.

In accordance with another embodiment of the apparatus of the present invention, the apparatus includes an air pump connected to the pressurized gas container, preferably a manually operable air pump.

BRIEF DESCRIPTION OF THE DRAWINGS

In the following detailed description, the present invention will be described more closely in an embodiment, with reference to the attached drawing, which is a side, elevational, schematic representation of a breathing apparatus in accordance with the present invention.

DETAILED DESCRIPTION

Figure 1:
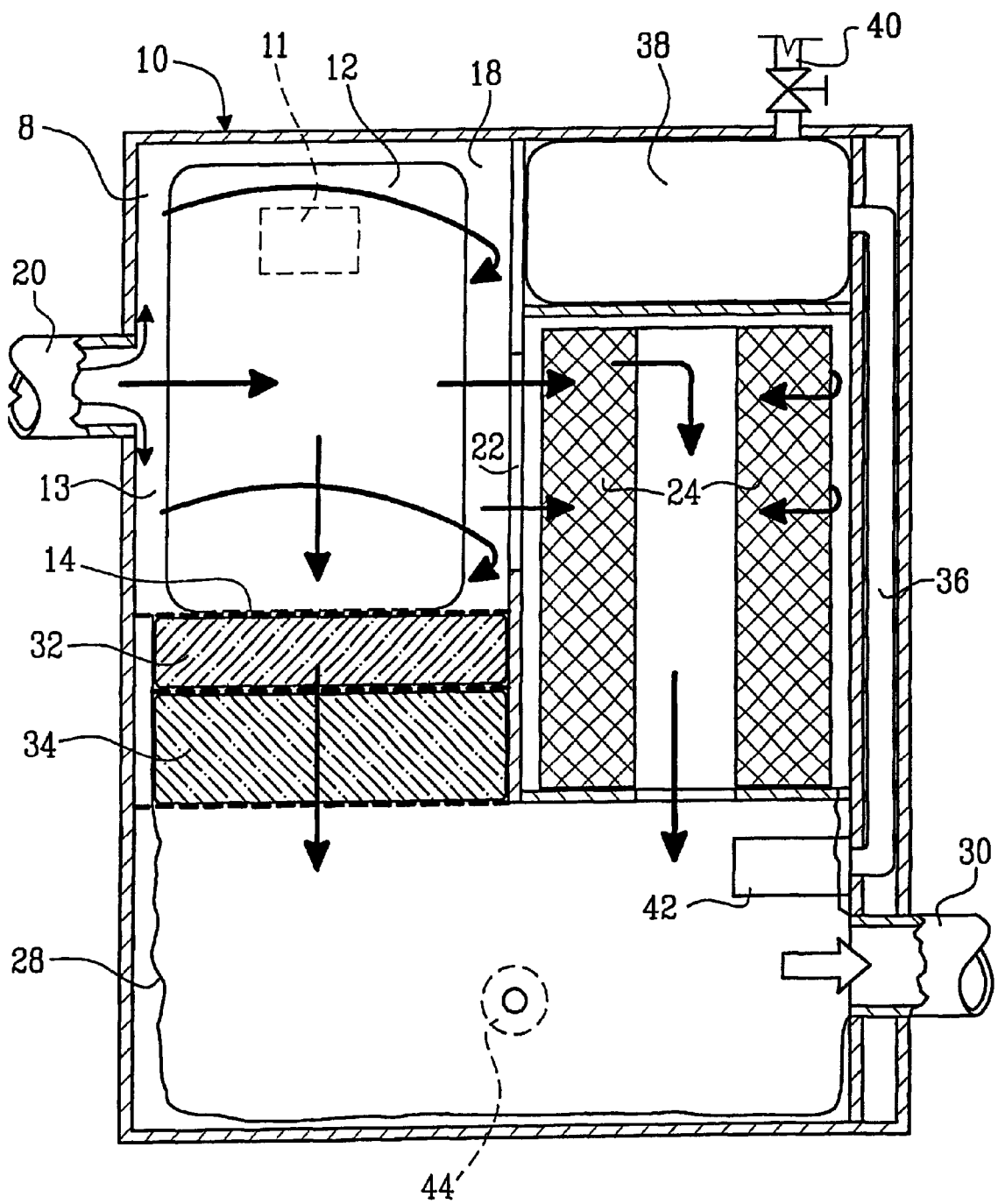

The breathing apparatus according to the present invention comprises of a housing 10, in which is arranged an oxygen accumulator 12 in the shape of a container 13, sealed at is upper end, with openings 14 in the bottom of the container, and a heating and/or cooling element arranged in the accumulator. The envelope surface 16 of the container is surrounded, with the exception of its perforated bottom side, by a chamber 18, which is connected, on the one hand to an inlet 20 for incoming exhaled air, and on the other hand to an outlet 22 leading to a carbon dioxide absorber 24, which in turn communicates with a breathing bellows 28, equipped with an outlet 30 for inhalation air.

The container 13 of the oxygen accumulator 12 contains a reversibly oxygen-fixating agent, which may be comprised, e.g., by a metal complex such as, e.g., cobalt-bis-salicylaldehyde-ethylene-diimine (Salcomine), cobalt-bis-3-fluoro-salicylaldehyde-ethylene-diimine (Fluomine), or cobalt-bis-3-ethoxy-salicylaldehyde-ethylene-diimine. Metal complexes in the form of cobalt phorfyrins may also be used. The use of simple inorganic salts is also contemplated. Said agents possess the feature of fixating oxygen within a certain, lower, temperature interval, and re-releasing the oxygen within a certain, higher, temperature interval. The ambient partial pressure of oxygen also constitutes an important factor thereby, since desorbtion decreases with an increasing pressure. When exhaled gas enters the chamber 18 surrounding the oxygen accumulator 12, the latter is warmed by the exhaled air, and if this heat is not sufficient, heat is supplied by the heating element 11 (which can be a heating or cooling element in different embodiments of the present invention), so that the oxygen liberated in the container of the accumulator 13 migrates downwards through a particle filter 32, where any chemical dust is separated. The oxygen continues through a further vapor filter 34, consisting e.g. of a silicon gel or a zeolite, preventing water vapor from entering the accumulator.

The outlet of the steam filter 34 communicates with the breathing bellows 28, in which also terminates a conduit 36 from a pressurized bottle 38, which contains a gas. This gas may be helium or some other gas mixture for diving deeper than 60 meters, or air for shallower diving. The function of the bellows is to act as gas storage between exhalation and inhalation. The inert gas supply may be constituted by two exchangeable five liter-bottles, a helium bottle, or air or some other diveable gas, while the other bottle with compressed air is arranged with a connection nipple 40, so that it may be easily connected to a manually operable hand or foot pump or the like. In the conduit 36 between the pressurized bottle 38 and the breathing bellows 28 there is arranged a hydrostatic valve 42, and in the breathing bellows there is arranged a pressure relief valve 44.

In the embodiment shown in the drawing, the breathing apparatus works as follows: Exhaled air, leaving the mouthpiece of the diver through a hose, is supplied to the chamber 18, and flows around the container 13 of the oxygen accumulator 12 without coming into contact with the oxygen fixating agent existing in the same, which would lead to the liberation of oxygen. The exhaled air passes through to the filter 24, in which the carbon dioxide is filtered. The thus cleaned exhaled air inflates the breathing bellows 28, and at any overpressure the pressure relief valve 44 is actuated to open the valve 44. During descent, the hydrostatic valve compensates the difference in pressure by opening the passage to the pressurized bottle 38. The latter may be refilled in the simplest conceivable manner by pumping with a manual pump. The oxygen released from the accumulator is purified from dust particles in the filters 32 and 34 before the oxygen enters the breathing bellows, where it is mixed with the purified exhaled air.

The oxygen accumulator 12 is charged by being exposed to atmospheric air or oxygen gas from a bottle. The carbon dioxide absorber is reactivated by heat or reduced $CO_2$ pressure.

The invention is not limited to the embodiment described above; rather, a multitude of variations are possible within the scope of the enclosed claims. For example, the breathing apparatus of the invention may be used in connection to smoke diving or other applications, such as the cleaning of tanks, or other types of maintenance work that takes place in a polluted atmosphere. For instance, during smoke diving, where the air pressure is constant, a second embodiment of the invention may be used advantageously, in which the hydrostatic valve and the pressurized container have been removed.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. Rechargeable breathing apparatus including a closed breathing system for receiving exhaled air containing carbon dioxide and supplying breathing air therefrom, said apparatus comprising means for adsorbing $CO_2$ from said exhaled air, a breathing bellows for receiving said exhaled air and delivering said breathing air, and an oxygen accumulator connected to said breathing bellows, said oxygen accumulator containing a reversably oxygen fixating agent and being rechargeable by bringing said reversably oxygen fixating agent into reaction with oxygen or air whereby oxygen is fixated thereto.

2. The apparatus of claim 1 including a pressurized gas container for a predetermined gas, and means for hydrostatic cooperation between said breathing bellows and said pressurized gas container.

3. The apparatus of claim 2 wherein said apparatus is adapted for use by an aqua diver or a smoke diver.

4. The apparatus of claim 2 wherein said predetermined gas is selected from the group consisting of helium, air and other diveable gases.

5. The apparatus of claim 2 including an air pump connected to said pressurized gas container.

6. The apparatus of claim 5 wherein said air pump comprises a manually operated air pump.

7. The apparatus of claim 1 including a temperature control element in connection with said oxygen accumulator.

8. The apparatus of claim 4 wherein said temperature control element comprises a heating or cooling element.

9. The apparatus of claim 1 wherein said reversably oxygen fixating agent comprises a metal complex.

10. The apparatus of claim 9 wherein said metal complex is selected from the group consisting of cobalt-bis-salicylaldehyde-ethylene-diimine (Salcomine), cobalt-bis-3-fluoro-salicylaldehyde-ethylene-diimine (Fluomine), and cobalt-bis-3-ethoxy-salicylaldehyde-ethylene-diimine.

11. The breathing apparatus of claim 9 wherein said metal complex comprises a cobalt phorfyrin.

12. The apparatus of claim 11 wherein said oxygen accumulator includes at least one outlet, a particle filter connected to said at least one outlet, and a water vapor absorbing filter connected to said at least one outlet.

13. The apparatus of claim 1 wherein said reversably oxygen fixation agent comprises a simple inorganic salt.

14. The apparatus of claim 1 including a chamber surrounding said oxygen accumulator, and a carbon dioxide absorber connected to said chamber.

* * * * *

UNITED STATES PATENT AND TRADEMARK OFFICE
CERTIFICATE OF CORRECTION

PATENT NO. : 6,684,881 B2
DATED : February 3, 2004
INVENTOR(S) : Oskar Frånberg

It is certified that error appears in the above-identified patent and that said Letters Patent is hereby corrected as shown below:

Column 5,
Line 1, "claim 4" should read -- claim 7 --.

Signed and Sealed this

Thirteenth Day of April, 2004

JON W. DUDAS
*Acting Director of the United States Patent and Trademark Office*